April 19, 1949.     H. M. SMITH     2,467,539
SPRING TESTER
Filed July 31, 1944
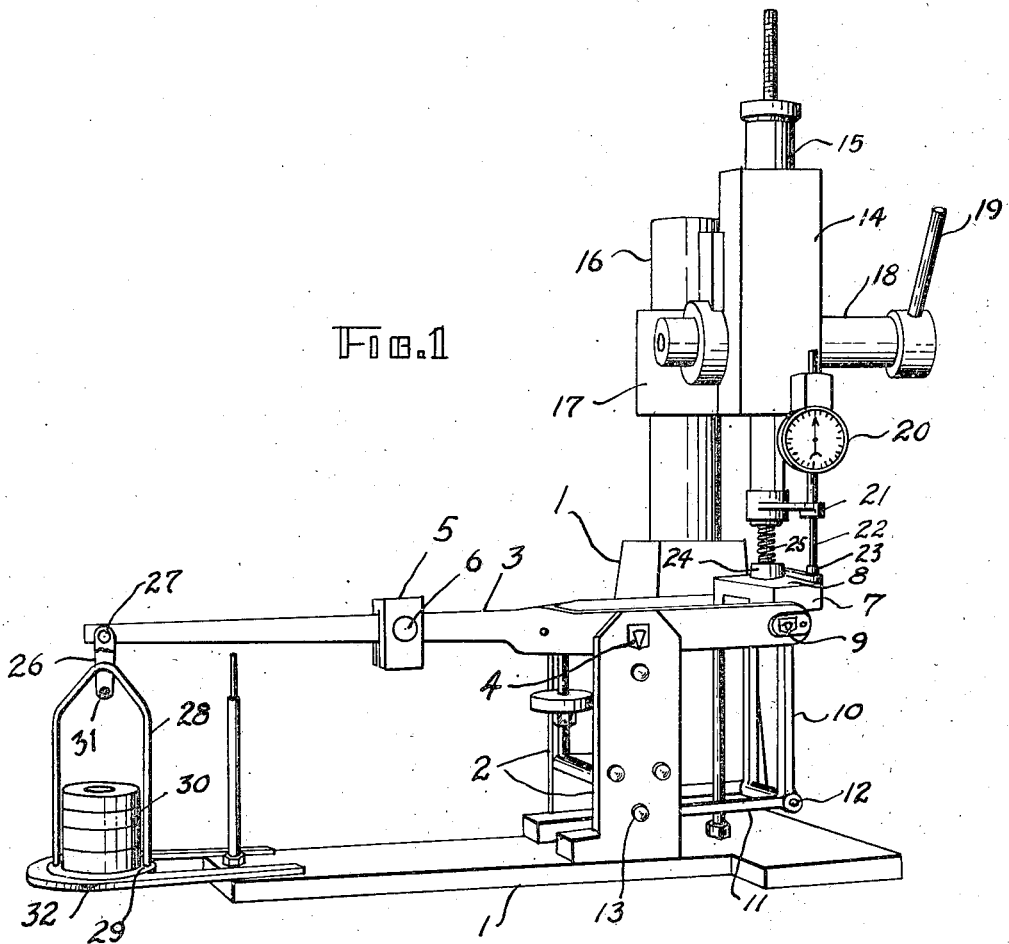
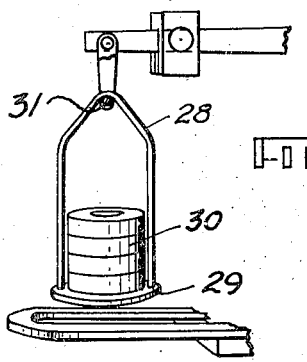
INVENTOR.
HOWARD M. SMITH
BY
Barnes, Kisselle, Laughlin & Raisch
Attorneys.

Patented Apr. 19, 1949

2,467,539

UNITED STATES PATENT OFFICE 2,467,539

SPRING TESTER

Howard M. Smith, Davisburg, Mich.

Application July 31, 1944, Serial No. 547,361

5 Claims. (Cl. 73—161)

This invention relates to a spring tester.

In the testing of springs, such, for example, as helical coil wire springs, it is common practice to place them under several different loads and measure their length for each load. In fact, the user of the spring usually specifies his standards as to the length of the spring under different loads which the manufacturer must meet. For example, the specification might require the coil spring to be two inches long under no load, an inch and a half plus or minus a few thousandths of an inch under a load of one pound, and an inch and a quarter plus or minus a few thousandths of an inch under a load of two pounds. In such case it is highly desirable to have a spring tester in which the length of the spring under these different loads can be accurately, expeditiously and simply tested by the ordinary unskilled operator.

It is the object of this invention to produce a machine for accurately, expeditiously and simply testing springs for length under a plurality of varying loads and which is capable of operation by ordinary unskilled labor.

Fig. 1 is an elevation of my machine with the spring in position preparatory to testing the same as to length under varying loads.

Fig. 2 is a detail showing the position of a portion of the apparatus where the spring is being tested for length under an increased or plural load.

Referring more particularly to the drawings it will be seen that my machine comprises a base 1, a pair of upright members 2 upon which a scale beam 3 is supported by a pair of knife edge pivots 4 supported upon conventional agate sockets. The scale beam 3 has slidably mounted thereon a weight 5 which can be locked in position on the beam by the set screw 6.

A platform 7 having a flat planar face 8 is pivotally supported adjacent one end of beam 3 by a standardized type of scale beam suspension on knife edges 9. Platform 7 has its upper face 8 always maintained level or horizontal by a parallelogram arrangement comprising links 10 and 11 pivoted together with a ball bearing pivot as at 12. Links 11 are pivotally mounted on uprights 2 by ball bearing pivots 13 perpendicularly below knife edge pivots 4. Links 10 are fixed to platform 7. Thus, at all elevations to which the platform 7 is pivoted, upper surface 8 will always remain horizontal or level due to the well-known parallelogram action of links 10 and 11 which cooperate with the beam 3 and uprights 2. In this well-known parallelogram action links 10 will always be parallel to a line passing through pivots 4 and 13 and links 11 will always be parallel to a line passing through pivots 4 and 9.

A cylinder 14 which houses plunger 15 is adjustably mounted upon post 16 by means of collar 17. Post 16 is supported on frame 1. Plunger 15 is arranged to be raised and lowered by means of a rotary shaft 18 provided with a crank handle 19. Plunger 15 is provided with a rack along one face which meshes with a gear fixed on shaft 18 within cylinder housing 14 so that turning of shaft 18 by handle 19 in a conventional manner will raise or lower plunger 15.

A conventional gauge or dial indicator 20 is mounted on the lower end of plunger 15 by bracket 21. The lower end of indicating plunger 22 contacts an abutment or gauge block 23 fixed on the horizontal face 8 of platform 7. A gauge block 24 is also mounted on platform 7 to serve as a support for the lower end of the spring 25 which is being tested. Thus, as crank handle 19 is turned to lower plunger 15 to thereby compress spring 25, the decrease in length of spring 25 is accurately recorded on the dial indicator 20.

The opposite end of the scale beam 3 has a bracket 26 pivoted thereon by pin 27. Handle 28 in the form of an inverted U passes through bracket 26 and supports at its lower end a secondary weight support 29. The weights are referenced 30. Bracket 26 is provided with a pin 31 which has a lost motion connection with handle 28 so that after the beam 3 is elevated a certain distance pin 31 will pick up handle 28, support 29 and weights 30. Platform 1 is provided with a rest 32 which supports the weights 30 and their supports 29 when not in use.

For purposes of description but not by way of limitation, my spring tester is shown for testing the length of a coil spring under two different loads. However, if desired, I can use my apparatus for testing the lengths of a spring under any number of different loads by adding additional weight pick up arrangements, such as above described.

The operation of the device is as follows: Assuming that one is testing the spring above referred to, cylinder housing 14 will be adjusted and locked in position on post 16 so that spring 25 can be placed upon block 24 and the plunger 15 lowered into contact with the upper end of the spring without loading spring 25 and so that the dial plunger 22 will just contact block 23 and the dial indicator will read zero. Weight 5 will be adjusted on beam 3 so that a load of one pound will have to be impressed upon spring 25 before the beam 3 will balance. An additional half pound weight will be placed upon support 29. Handle 19 will now be turned to lower plunger 15 until a load of one pound is imposed upon spring 25 and beam 3 will be in balance. At this time, if the spring meets specifications, the dial indicator should read one and a half inches. The plunger 15 is now lowered further to impress a greater load on spring 25 until the additional one-half pound dead weight is picked up by bracket 26 at the end of the scale. The spring will now be under a load of one and one-half pounds and if it meets the required standard, the indicator will read one and one-quarter inches.

If desirable, a third or any additional number of weights could be picked up consecutively by still further compressing spring 25 and causing further travel of the beam to obtain additional load length tests of the spring.

With the apparatus set up as indicated, the operator simply inserts a spring 25 upon block 24 with the plunger 15 in raised position and then turns handle 19 until the beam balances for weight 5 and then reads the dial indicator for the length of the spring under its first load, and then the operator turns the handle still further until the additional weights 30 are picked up whereupon the dial indicator is read for the second length of the spring under loads consisting of the sliding weight 5 and the dead weight 30. Thus, it will be seen that a coil spring can be tested on my apparatus for length under different loads efficiently, simply and quickly by one requiring no special skill.

I claim:

1. A spring tester for testing the length of a spring under different loads comprising in combination a pivoted beam, a support for the spring being tested mounted on the beam on one side of the pivot, means opposite said support and movable towards said support to apply pressure on said spring and compress the spring between said means and the support, said beam being arranged to pivot as pressure is applied on said spring, a plurality of different resistance means arranged to be consecutively applied to the pivoted beam on the other side of the said pivot as the beam pivots in one direction, an operative connection between the first of said resistance means and said beam whereby said first resistance means immediately opposes movement of the beam upon the application of said pressure upon said spring and support, a lost motion connection between another of said resistance means and said beam whereby said other resistance means opposes movement of the beam after the pressure applied against the spring exceeds the counter-pressure exerted by said first resistance means and whereby the spring is loaded consecutively and cumulatively with a plurality of different loads, and means operatively connected to said support and pressure applying means for indicating the length of the spring for each of the different loads.

2. A spring tester for testing the length of a spring under different loads comprising in combination a pivoted beam, a support pivoted on the beam on one side of the beam pivot, a plurality of different resistance means arranged to consecutively apply a load on the beam on the opposite side of the beam pivot, a plunger opposite said pivoted support and movable toward said support to apply pressure on said spring and compress the spring between the plunger and the support to different lengths as the different resistance means are consecutively and cumulatively applied to the beam, said beam being arranged to pivot as pressure is applied on said spring, an operative connection between the first of said resistance means and said beam whereby said first resistance means immediately opposes movement of the beam upon the application of said pressure upon said spring and support, a lost motion connection between another of said resistance means and said beam whereby said other resistance means opposes movement of the beam after the pressure applied against the spring exceeds the counter-pressure exerted by said first resistance means and means for indicating the length of the spring for each of the different loads.

3. A spring tester for testing the length of a spring under different loads comprising in combination a pivoted beam, a support for the spring being tested mounted on the beam on one side of the beam pivot, a plunger arranged to contact an end of the spring and movable toward said support to compress said spring and simultaneously pivot said beam, a weight mounted on the beam on the side of the beam pivot opposite to said support, and at least one additional weight having a lost motion connection with the weight side of said beam and arranged to be picked up by the beam after the pressure applied against the spring by the plunger exceeds the counter-pressure exerted by the weight on said arm whereby the spring is subjected consecutively and cumulatively to a plurality of different loads, and dial indicating means mounted between the plunger and the spring support for indicating the length of the spring for each of the different loads whereby upon a single stroke of said plunger in one direction the different lengths of said spring under different loads can be ascertained.

4. A spring tester comprising in combination a pivoted beam, a support mounted on said beam on one side of the pivot for said beam, said support being adapted to contact the spring being tested at one end, means opposite said support adapted to contact the other end of the spring and movable toward said support to compress said spring and simultaneously pivot said beam, a plurality of weights on the opposite side of the pivot for said beam arranged to consecutively and cumulatively add their weight to the weight side of the beam to thereby apply different loads to said spring as the above-mentioned means moves toward said support, an operative connection between the first of said weights and said beam whereby said first weight immediately opposes movement of the beam upon the application of said pressure upon said spring and support, a lost motion connection between another of said weights and said beam whereby said other weight opposes movement of the beam after the pressure applied against the spring exceeds the counter-pressure exerted by said first weight and, indicating means for indicating the length of the spring under such different loads whereby upon a single stroke of said plunger in one direction the different lengths of said spring under different loads can be ascertained.

5. A spring tester comprising in combination a pivoted beam, a platform pivotally mounted on the beam on one side of the beam pivot, a parallelogram linkage connected to said support for keeping the same horizontal as the beam pivots, a plunger movable toward and away from said support, the said spring to be tested being mounted between the plunger and the spring support, an adjustable weight mounted on the beam on the opposite side of the beam pivot from the side on which the platform is mounted, at least one other weight having a lost motion connection with the weight side of the beam whereby as the plunger is moved toward the support the adjustable weight resists movement of the support and the spring is loaded and compressed and upon further movement of the plunger toward the support the second weight is picked up by the beam and the spring is additionally loaded with a load equal to the resistance applied by both the first and second weights, and indicating means between the plunger and support for indicating the length of the spring under each of said different loads.

HOWARD M. SMITH.

REFERENCES CITED

The following references are of record in the file of this patent:

UNITED STATES PATENTS

| Number | Name | Date |
|---|---|---|
| 277,898 | Harty | May 22, 1883 |
| 1,510,218 | Goodwin | Sept. 30, 1924 |
| 1,992,987 | Bilzer et al. | Mar. 5, 1935 |
| 2,033,212 | Walker | Mar. 10, 1936 |
| 2,164,453 | Gaskins | July 4, 1939 |

FOREIGN PATENTS

| Number | Country | Date |
|---|---|---|
| 100,853 | Great Britain | July 20, 1916 |